United States Patent [19]
Williams et al.

[11] Patent Number: 5,436,073
[45] Date of Patent: Jul. 25, 1995

[54] MULTI-LAYER COMPOSITE

[75] Inventors: Robert J. Williams, Painesville; William E. Kidon, Chardon; Thanh Nguyen; Michael D. Hilston, both of Painesville, all of Ohio

[73] Assignee: Avery Dennison Corporation, Pasadena, Calif.

[21] Appl. No.: 66,554

[22] Filed: May 26, 1993

[51] Int. Cl.6 .................... B32B 23/08; B32B 27/10
[52] U.S. Cl. .................... 428/343; 428/352; 428/354; 428/355; 428/451; 428/507; 428/511; 428/512; 428/513; 428/514
[58] Field of Search ............ 428/343, 352, 354, 355, 428/451, 507, 511, 512, 513, 514

[56] References Cited

U.S. PATENT DOCUMENTS

| | | | |
|---|---|---|---|
| 3,575,910 | 4/1971 | Thomas | 260/29.6 |
| 3,726,710 | 4/1973 | Berger et al. | 117/93.31 |
| 3,749,593 | 7/1973 | Kelser | 117/68 |
| 3,759,807 | 9/1973 | Osborn et al. | 204/159.23 |
| 3,878,263 | 4/1975 | Martin | 260/825 |
| 4,016,333 | 4/1977 | Gaske et al. | 428/447 |
| 4,026,826 | 5/1977 | Yoshida et al. | 260/25 |
| 4,064,286 | 12/1977 | Hahn | 427/44 |
| 4,201,808 | 5/1980 | Cully et al. | 428/40 |
| 4,251,597 | 2/1981 | Emmons et al. | 428/500 |
| 4,301,268 | 11/1981 | Kropac | 528/26 |
| 4,306,050 | 12/1981 | Koerner et al. | 528/26 |
| 4,722,865 | 2/1988 | Huizer | 428/407 |
| 4,824,875 | 4/1989 | Gutek | 522/9 |
| 4,908,274 | 3/1990 | Jackmann et al. | 428/452 |
| 4,956,221 | 9/1990 | Gutek | 428/142 |
| 4,963,438 | 10/1990 | Weitemeyer | 428/447 |
| 4,978,726 | 12/1990 | Döhler et al. | 525/479 |
| 5,034,084 | 7/1991 | Schafer et al. | 156/278 |
| 5,034,491 | 7/1991 | Wewers et al. | 528/41 |
| 5,057,579 | 10/1991 | Fock et al. | 525/329.5 |
| 5,104,847 | 4/1992 | Hann et al. | 503/227 |
| 5,115,039 | 5/1992 | Fock et al. | 525/329.5 |
| 5,115,040 | 5/1992 | Fock et al. | 525/329.5 |
| 5,128,391 | 7/1992 | Shustack | 522/92 |
| 5,145,914 | 9/1992 | Esselborn et al. | 525/329.5 |

OTHER PUBLICATIONS

Radiation Curable Silicones, TEGO RC 726 Data Sheet. TH. Goldschmidt AG.
TMPTA Monomer Data Sheet, Radcure Specialties, Inc. Feb. 1990.
ODA Monomer Data Sheet, Radcure Specialties Inc., Feb. 1990.
HDODA Monomer Data Sheet Radcure Specialties, Inc., Feb. 1990.
Uveryl 7100, Data Sheet, Radcure Specialties, Inc., Feb. 1990.
EB Curable Release Coatings, Skeist Inc., pp. 622-628.

*Primary Examiner*—D. S. Nakarani
*Attorney, Agent, or Firm*—Renner, Otto, Boisselle & Sklar

[57] ABSTRACT

A composite laminate suitable for preparing release sheets or pressure-sensitive adhesive sheets is described. The composite laminate, in one embodiment, comprises (A) a substrate sheet of paper; (B) a first coating bonded to one surface of the substrate, said first coating comprising a radiation-cured composition acrylic comprising, prior to curing, a mixture of (i) at least one acrylated or methacrylated organic polyamino compound, and (ii) at least one acrylated or methacrylated organic polyhydroxy compound; and (C) a second coating bonded to the other surface of the substrate, said second coating comprising a polyolefin film.

20 Claims, 1 Drawing Sheet

MULTI-LAYER COMPOSITE

TECHNICAL FIELD

This invention relates to laminate materials. More particularly, the invention relates to composite laminate materials suitable for preparing release sheets and composites coated with a pressure-sensitive adhesive.

BACKGROUND OF THE INVENTION

Release sheets are widely used in a variety of commercial applications. For example, in food packaging, it is desirable that the food articles not stick to the paper of the carton or other wrappings. Articles such as decals, labels, tapes, etc., which employ a pressure-sensitive adhesive utilize a protective release sheet over the adhesive. When such a product is used, the release sheet is peeled off and discarded and the exposed pressure-sensitive tape pressed onto the surface where the decal, label, or tape is to be placed. A common variety of release paper is one wherein one side of the paper (the release side) is coated with a polymeric siloxane material. It is also known to coat substrates such as paper with a thermoplastic material such as polyethylene and then overcoat the thermoplastic layer with an overcoating of a polymeric siloxane material.

Although these types of release sheets have been widely used, there continues to be a need to improve the properties thereof, particularly, when the release sheet is based upon the use of a paper substrate. It is desirable to develop procedures and composites which exhibit improved bonding between the siloxane layer and the underlying substrate and to reduce the tendency of silicone release materials to adhere or transfer to other surfaces. Another significant problem exhibited by some composites such as composites using a polymeric film as the base substrate, particularly when exposed to severe humidity and temperature conditions is curling due to the dimensional instability of the composite. For example, if composites curl as they are passed through a printer such as a laser printer where the composite is exposed to high temperatures, the composite may jam in the printer and/or the desired printed image will be fuzzy or uneven and unacceptable. The tear strengths of composites, particularly when used as decals, labels and tape also are important. It is desirable that the decals, labels and tape be easily removed without tearing, particularly if they are to be reused. A particularly desirable property of composites, particularly composites to be used as decals and labels is their ability to retain their flat configuration under extreme conditions such as high or low humidity, high or low temperature, etc., over a period of time. Decals and labels have a tendency to be dimensionally unstable and cuff when subjected to such conditions.

U.S. Pat. No. 3,749,593 describes a laminate material which is produced by coating a substrate with a first silicone release agent coating containing a curing catalyst, a curing accelerator and/or an adhesion promoter and subsequently overcoating said first silicone release coating with a second silicone release agent coating containing a curing agent but no cure accelerator or adhesion promoter. The laminates are particularly useful as release sheets. The substrate may be a paper substrate having bonded to one surface thereof, or to both surfaces, a polyolefinic material.

SUMMARY OF THE INVENTION

A composite laminate suitable for preparing release sheets or pressure-sensitive adhesive sheets is described. The composite laminate, in one embodiment, comprises (A) a substrate sheet of paper; (B) a first coating bonded to one surface of the substrate, said first coating comprising a radiation-cured acrylic composition comprising, prior to curing, a mixture of (i) at least one acrylated or methacrylated organic polyamino compound, and (ii) at least one acrylated or methacrylated organic polyhydroxy compound; and (C) a second coating bonded to the other surface of the substrate, said second coating comprising a polyolefin film.

DESCRIPTION OF THE PREFERRED EMBODIMENTS

The composite laminate of the present invention utilizes as a first layer, a substrate sheet of paper. Paper substrates are particularly useful because of the wide variety of applications in which they can be employed. Any type of paper having sufficient tensile strength to be handled in conventional paper coating and treating apparatus can be employed as the substrate layer. Thus, any type of paper can be used depending upon the end use and particular personal preferences. Included among the types of paper which can be used is paper, clay coated paper, glassine, polymer coated paper, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any weight can be employed as a substrate material, paper having weights in the range of from about 20 to about 150 pounds per ream are useful, and papers having weights in the range of from about 30 to about 60 pounds per ream are presently preferred. The term "ream" as used herein equals 3000 square feet. Examples of specific papers which can be utilized as substrates in preparing the deposit laminates of the present invention include 41-pound offset grade bleached Kraft; 50-pound bleached Kraft paper, etc.

In the composite laminates of the present invention, the substrate sheet of paper contains a first coating bonded to one exposed surface of the substrate, said first coating comprising a radiation-cured acrylic composition comprising, prior to curing, a mixture of (i) at least one acrylated or methacrylated organic polyamino compound, and (ii) at least one acrylated or methacrylated organic polyhydroxy compound.

The first coating is derived from a radiation-curable acrylic composition which is prepared by blending the acrylated or methacrylated organic polyamino compound with the acrylated or methacrylated organic polyhydroxy compound. The compounds derived from polyamines contain at least two acrylyl or methacrylyl groups, and the compounds derived from the polyhydroxy compounds contain at least two acryloyl or methacryloyl groups which form a network upon polymerization (curing).

The acrylated or methacrylated organic polyamino compounds useful in the first coating include compounds represented by the general formula $$R-(-C(O)-C(X)=CH_2)_n \qquad (I)$$

wherein R is derived from a polyamine, X is hydrogen or methyl and n is an integer of at least 2 and is preferably 2, 3 or 4. In this specification and claims, compounds represented by the general Formula I above may be referred to as "acrylates" or "methacrylates" for convenience since they are derived from acrylic acid or methacrylic acid even though the compounds formed on reaction of the acid with a polyamine is an amide and not an ester.

The polyamines may be monomeric compounds such as ethylenediamine, 1,3-propanediamine, 1,4-butanediamine, 1,6-hexanediamine, dimethylenetriamine, dipropylenetriamine, triethylenetetramine, etc. The polyamines also may be oligomeric compounds such as dimeric, trimeric or tetrameric polyamino compounds. The acrylated and methacrylated organic polyamino compounds used in the first coating composition and generally represented by the above Formula I may be prepared by techniques well known to those skilled in the art such as by the reaction of a polyamine compound with acrylic acid or methacrylic acid in amounts to provide the desired di-, tri, tetra-, or polyacrylated product. The molecular weights of the acrylated and methacrylated polyamine products may be as high as 2000 and are generally below about 1200. In one embodiment, the molecular weight of the acrylated and methacrylated polyamines is within the range of from about 500 to about 1000. It is preferred that these acrylated and methacrylated polyamine compounds are liquids so that they may be readily blended with the acrylated polyhydroxy compounds and utilized in coating the substrate. In general, the acrylated and methacrylated polyamine compounds may have viscosities at 25° C. of from about 2 to about 2500 cps., preferably, from about 50 to about 2000 cps., and more preferably between about 400 and about 2000 cps.

Specific examples of acrylated or methacrylated organic polyamino compounds include, for example, N,N'-diacrylylethylenediamine, N,N'-diacrylyl-1,3-propanediamine, N,N'-dimethacrylyl-1,6-hexanediamine, etc. Useful acrylated and methacrylated polyamino compounds are available commercially. An example of a commercially available acrylated amine product is Uvecryl® 7100, an acrylated amine oligomer available from UCB Radcure, Atlanta, Ga. This acrylate functional oligomeric amine is a liquid having a viscosity in the range of 500–1500 cps at 25° C. and theoretical molecular weight of 800.

The second essential component of the radiation-curable acrylic composition utilized to form the first coating is (ii) at least one acrylated or methacrylated organic polyhydroxy compound. These polyhydroxy derivatives contain at least two acryloyl or methacryloyl groups in order to form a network upon polymerization (curing). Suitable compounds include compounds represented by the general Formula II $$R-(-C(O)-C(X)=CH_2)_n \qquad (I)$$

wherein R is derived from a polyhydroxy compound, X is hydrogen or methyl and n is an integer of at least 2 and is preferably 2, 3 or 4.

The acrylated and methacrylated organic polyhydroxy compounds (ii) useful in the first coating and represented by the general Formula II may be prepared by techniques well known to those skilled in the art such as by the reaction of a polyhydroxy compound with acrylic acid or methacrylic acid in amounts to provide the desired polyacrylated product which is preferably a di-, tri-, or tetra-acrylated product. The molecular weights of the acrylated and methacrylated polyhydroxy compounds may be as high as 2000 and are generally below 1200. In one embodiment, the molecular weight of these compounds is between about 500 to about 1000. It is preferred that these acrylated and methacrylated polyhydroxy compounds are liquids which are not too viscous so that they can readily be blended with the acrylated or methacrylated polyamine (ii). In general, these compounds may have viscosities at 25° C. at from about 2 to about 1000 cps., preferably from about 2 to about 500 cps., and more preferably between about 2 and 300 cps.

The polyfunctional compounds containing at least two hydroxyl groups may be monomeric compounds such as ethylene glycol, diethylene glycol, 1,6-hexanediol, neopentylglycol, trimethylolpropane, pentaerythritol, etc. The polyfunctional compounds containing two or more hydroxyl groups also may be oligomeric compounds such as dimeric, trimeric or tetrameric polyhydroxy compounds.

Specific examples of acrylated and methacrylated organic polyhydroxy compounds include, for example, glycerol diacrylate, diethylene glycol diacrylate, 1,6-hexanediol diacrylate (HDODA), triethylene glycol diacrylate, trimethylol propane triacrylate (TMPTA), neopentyl glycol diacrylate, neopentyl glycol triacrylate, neopentyl glycol tetraacrylate, tripropylene glycol diacrylate (TRPGDA), 1,6-hexanediol dimethacrylate, ethylene glycol dimethacrylate, etc.

The radiation-curable acrylic composition which is used to form the first coating generally comprises (i) from about 30% to about 80% by weight of at least one acrylated or methacrylated organic polyamino compound and (ii) from about 20% to about 70% by weight of at least one acrylated or methacrylated organic polyhydroxy compound as described above. In another embodiment, the radiation-curable composition used to form the first coating comprises (i) from 50% to about 70% of the acrylated or methacrylated organic polyamino compound, and (ii) from about 30% to about 50% by weight of at least one acrylated or methacrylated organic polyhydroxy compound.

When the radiation-curable acrylic composition used to form the first coating is to be cured by exposure to non-ionizing radiation such as ultraviolet light, at least one photoinitiator is included in the curable composition in amounts of from about 0.5 to about 5% or even up to about 10% based on the total weight of the radiation-curable composition. Photoinitiators are not required when the radiation-curable composition is cured by electron beam radiation. Examples of photoinitiators which may be used in combination with ultraviolet light includes, for example, benzil ketals, benzoin ethers, acetophenone derivatives, ketoxime ethers, benzophenone, benzo or thioxanthones, etc. Specific examples of photoinitiators include: 2,2-diethoxyacetophenone; 2- or 3- or 4-bromoacetophenone; benzoin; benzophenone;

benzoquinone; 1-chloroanthroquinone; p-diacetyl-benzene; 9,10-dibromoanthracene; 1,3-diphenyl-2-propanone; 1,4-naphthyl-phenylketone; 2,3-pentenedione; propiophenone; chlorothioxanthone; xanthone; and mixtures thereof.

The radiation-curable release compositions used to form the first coating are prepared by mixing the above-described components. The components may be mixed at room temperature with stirring, and mild heating may be employed in some instances to facilitate mixing. Since the components of the composition may undergo some separation during storage, mild agitation or mixing just prior to use is effective to redisperse the components and is recommended.

The first coating which is bonded to one surface of the substrate is obtained by applying the radiation-curable acrylic composition to the substrate prior to curing. The acrylic compositions may be applied to a substrate as a coating by any conventional means known in the coating art such as by roller coating, curtain coating, brushing, spraying, reverse roll coating, doctor knife, dipping, offset gravure, etc. In one particular embodiment, the liquid radiation-curable acrylic composition is applied to the paper substrate using offset gravure techniques. The liquid being applied to the substrate may be heated or cooled to facilitate the coating process and to alter the depth of penetration of the liquid into the substrate prior to curing. Because of the porous nature of paper, the liquid acrylic composition penetrates into the paper, and as a result of the coating and the penetration, paper substrates coated with the radiation-cured acrylic compositions exhibit many of the desired characteristics of polymer films such as increased strength, durability, etc.

The amount of the radiation-curable acrylic composition applied to the substrate as a first coating may be varied depending upon characteristics desired to be imparted to the substrate and the particular formulation of the curable composition. If an excess of the coating composition is applied to the substrate, the physical characteristics of the substrates may be affected in an undesirable manner. Also, for economic reasons, it is normally desired to apply the lowest amount of coating to obtain the desired results. Typically, the applied coating weights may, depending on the substrate and intended use, range from about 0.5 to about 50 or more grams/m$^2$. More often, applied coating weights are from about 1 to about 5 grams/m$^2$. At these levels, the coated paper substrate is characterized as having increased dimensional stability, increased strength, increased thermal stability and increased resistance to solvents and moisture. It also has been observed that paper substrates containing a first coating is described herein maintain their flat and planar characteristics when exposed to harsh atmospheric conditions such as high and low humidity, high and low temperature, etc.

The paper substrates containing the first coating as described above can be cured by exposure to known forms of ionizing or actinic non-ionizing radiation. Useful types of radiation include ultraviolet light, electron beam, x-ray, gamma-ray, beta-ray, etc. If ultraviolet light is to be used as the form of radiation, a photoinitiator such as described above is included in the curable release composition. Photoinitiators are not required for election beam curing. One of the advantages of using radiation to effect cure of the composition is that polymerization takes place rapidly at ambient temperature, and heating is not necessary. The equipment for generating these forms of radiation are well known to those skilled in the art. Electron beam radiation is the presently preferred form of radiation to be used with the compositions of the present invention.

Curing of the release compositions of the present invention can be effected in a continuous manner by passing the coated substrate through radiation equipment which is designed to provide the coated substrate with sufficient residence time to complete the cure of the coating. Curing may be effected in an air atmosphere or in an inert atmosphere such as nitrogen or argon. An inert atmosphere is preferred. The length of exposure necessary to cure the acrylic compositions varies with such factors as the particular formulation used, type and wavelength of radiation, dosage rate, the atmosphere, energy flux, concentration of photoinitiator (when required), and thickness of the coating. Dosage rates of from 0.1 to about 10 megarads, generally below 4 megarads provide the desirable curing. Generally, the exposure is quite brief and curing is completed in less than about 0.1 to 3 seconds. The actual exposure time required to give proper curing for various release compositions can be readily determined by one skilled in the art with a minimum of experimentation. Excess curing of the release compositions generally should be avoided.

The composite laminates of the present invention also comprise (C) a second coating which is bonded to the other surface of the substrate. That is, the second coating is applied to and bonded to the surface of the substrate which is opposite to the surface containing the first coating. The second coating which is bonded to the substrate comprises a polyolefin film. The olefin film may comprise polymers and copolymers of monoolefins having from, for example, 2 to 12 carbon atoms, preferably 2 to 8 carbon atoms. Most preferred are the polymers of $\alpha$-olefins having from 2 to 4 carbon atoms per molecule. Examples of said homopolymers include polyethylene, polypropylene, poly-1-butene, etc. An example of a copolymer within the above definition is a copolymer of ethylene with 1-butene having from 1 to 10, preferably from 1 to 5 and more preferably from 1 to 3 weight percent of the 1-butene comonomer incorporated into the copolymer molecule. Blends of copolymers with polyisobutylene also are useful, and examples of such blends include those blends containing up to about 35 weight percent, preferably from 1 to 35 weight percent of polyisobutylene and from 99 to 65 weight percent of a copolymer of ethylene, another comonomer such as 1-butene. Polyethylene and polypropylene are presently preferred coating materials, and polyethylene is the most preferred coating material. The useful polyethylenes include the low density polyethylenes and the high density polyethylenes. The selection of a high density or low density polyethylene will depend upon the intended application and the types of materials which the exposed surface of the polyethylene film will contact in use.

The polyolefins can be extrusion-coated onto the paper substrate at extrusion temperatures such as temperatures within the range of from about 210° C. to about 270° C. using any standard extrusion process known to the art. The process is conveniently carried out in a continuous manner, and the amount of polyolefin coating applied to the paper substrate will usually be within the range of from about 3 to about 30, and preferably from about 5 to about 20 pounds per ream.

For example, the second coating of the composite laminates of the present invention may be a high-density polyethylene applied at from about 5 to 10 pounds per ream, or the second coating may comprise a linear low-density polyethylene homopolymer applied at about 15 to 20 pounds per ream.

Although the radiation-cured acrylic composition described above which is applied to one surface of the substrate is referred to herein as "a first coating", and the polyolefin film applied to the other surface of the substrate is referred to herein as "a second coating", these terms are utilized herein to reference the various coatings in the composite laminate and are not intended to indicate any order of application. In fact, the composite laminate can be prepared by first applying the radiation-curable acrylic composition to one exposed surface of the substrate and thereafter applying the polyolefin coating, or the so-called second coating of polyolefin film can be applied to the substrate first followed by application of the radiation-curable acrylic composition to the other exposed surface of the substrate. When the substrate is coated with the radiation-curable composition prior to application of the polyolefin coating to the other exposed surface of the substrate, it is desirable to cure the radiation-curable composition prior to applying the polyolefin film in order to bond the cured composition to the substrate before the polyolefin film is extruded onto the other exposed surface of the substrate.

Alternatively, the "second coating" of polyolefin film is bonded to one exposed surface of the substrate by techniques well known to those skilled in the art, and the other exposed surface of the substrate is then coated with the radiation-curable acrylic composition. The laminate thus obtained with a polyolefin film bonded to one surface of the substrate, and a curable composition deposited on the other surface of the substrate is then subjected to radiation to cure the curable composition. Since the polyolefin film is also subjected to the radiation, the polyolefin film can undergo additional cross-linking during the radiation treatment. The additional curing of the polyolefin film is not detrimental and, in some instances has proven to be beneficial. Accordingly, the presently preferred process for preparing a composite laminate of the type described above comprises (A) applying to one side of a paper sheet substrate, a coating comprising a polyolefin film; (B) applying to the other surface of the substrate, a second coating which comprises a radiation-curable acrylic composition comprising (i) at least one acrylated or methacrylated organopolyamino compound, and (ii) at least one acrylated or methacrylated organic polyhydroxy compound; and (C) subjecting the composite to radiation to effect a cure of the first and second coatings. The radiation dosage should be at least sufficient to cure the radiation-curable acrylic composition which comprises the first coating, and the dosage should not be so high as to cause either the first or second coating to deteriorate. As mentioned above, the length of exposure to the radiation which is necessary to cure the first coating composition varies with such factors as the particular formulation used, the type and wavelength of radiation, the thickness of the coating, etc. Generally, only brief exposure is required and curing can be completed in less than about 0.1 to 3 seconds. The actual exposure time required to give proper curing can be readily determined by one skilled in the an with a minimum of experimentation.

Figure 1:
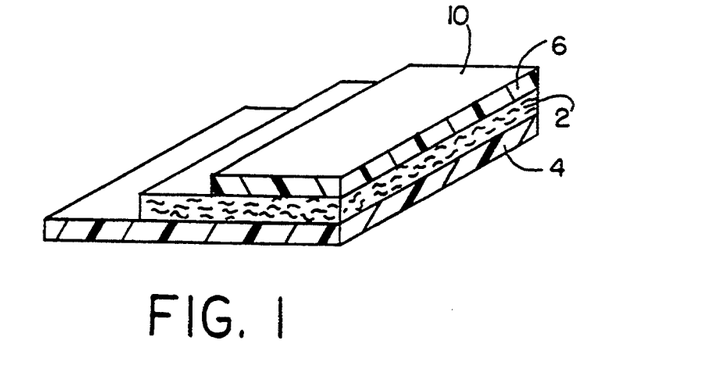
FIG. 1 is a cross-section of a composite laminate in accordance with the present invention which comprises three layers.

A composite laminate comprising a paper substrate and first and second coatings as described above is illustrated in FIG. 1, and the composite is generally indicated by reference numeral 10. The composite comprises a substrate 2 which is coated with the first coating 4 which comprises the radiation-cured acrylic composition described above, and layer 6 represents the second coating comprising a polyolefin film which is bonded to the paper substrate 2.

Figure 2:
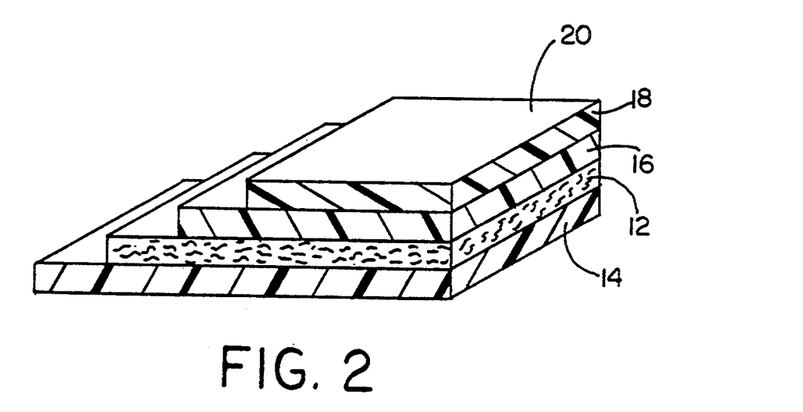
FIG. 2 is a cross-section of another composite laminate in accordance with the present invention which comprises four layers.

In another embodiment of the present invention, the composite laminate described above which comprises (A) a substrate sheet of paper (B) a first coating bonded to one surface of the substrate, said first coating comprising a radiation-cured acrylic composition comprising, prior to curing, a mixture of (i) at least one acrylated or methacrylated organic polyamino compound, and (ii) at least one acrylated or methacrylated organic polyhydroxy compound; (C) a second coating bonded to the other surface of the substrate, said second coating comprising a polyolefin film; and (D) a third coating of a radiation-cured silicone release composition bonded to the exposed surface of the second coating of polyolefin film. This embodiment is illustrated in FIG. 2, and the composite is generally referred to by reference numeral 20. The composite comprises the substrate sheet of paper 12, the first coating 14 bonded to one surface of the substrate 12 and a second coating 16 of polyolefin which is bonded to the other surface of substrate 12. A third coating 18 of cured silicone release composition is in contact with and bonded to the polyolefin film 16.

If desired, the second coating of polyolefin film can be activated prior to application of the third coating of curable silicone release composition (or the pressure-sensitive adhesive discussed below) to improve the bond between the second and third coatings. The surface of the polyolefin can be activated by treatments such as flame oxidation; chemical oxidation; treatment with a variety of agents such as ozone, chlorine and various acids; various forms of electrical bombardment or discharge treatments such as corona discharge, glow discharge, etc., using readily available equipment and known techniques.

The third coating of a radiation-cured silicone release composition which is bonded to the second coating of polyethylene film is obtained by applying a radiation-curable silicone release composition to the second coating of polyethylene film and thereafter subjecting the coating to radiation.

The radiation-curable silicone release compositions which may be utilized to form the third coating comprise any of the organopolysiloxanes known in the an which provide release properties and which can be cured by radiation with or without the assistance of a photoinitiator. One type of organopolysiloxane which is useful in preparing release coatings contain acryloxy groups methacryloxy groups or mixtures thereof. A variety of acryloxy or methacryloxy containing organopolysiloxanes are known and can be used for release coatings. In one embodiment, the organopolysiloxane compounds containing acryloxy and/or methacryloxy groups which can be utilized in the present invention may be presented by the general Formula III (III)

wherein each R is acryloxy, methacryloxy, an n-substituted monovalent hydrocarbon group containing from 1 to 20 carbon atoms or a substituted monovalent hydrocarbon group wherein the substituents are selected from the class consisting of chloro-, fluoro-, cyano-, amido-, nitro-, ureido-, isocyanato-, carbalkoxy-, hydroxy-, acryloxy-, methacryloxy-, etc.; n has an average value of about 1.8 to 2.2; and m has an average value greater than 2, preferably greater than about 25, and more preferably, from about 100 to about 500; the organopolysiloxane containing an average of at least one R group which contains an acryloxy or methacryloxy group, namely, $$CH_2=C(X)C(O)-O- \qquad (IV)$$

wherein X is hydrogen or methyl. The substituents represented by R in structure IV include, for example, monovalent aliphatic groups such as methyl, ethyl, propyl, hexyl, etc.; monovalent cycloaliphatic groups such as cyclohexyl, cyclopentyl, etc.; aryl groups such as phenyl, methylphenyl, benzyl, etc.; alkenyl groups such as vinyl, allyl, 3-butenyl, etc. Examples of R groups which are substituted hydrocarbon groups include pentachlorophenyl, aminomethyl, 3-aminopropyl, etc.

Each acryloxy or methacryloxy group is attached to the siloxane backbone through a carbon-to-silicon bond or a carbon-oxygen-silicon bond. More often, there are present an average of from about 2 to about 25, more preferably from about 2 to about 10 of the R groups containing an acryloxy or methacryloxy group. Alternatively, the organopolysiloxane compounds containing acryloxy and/or methacryloxy groups useful in the present invention may be defined as containing from about 3% to about 75% by weight of acryloxy or methacryloxy groups, more often from about 3% to about 50% by weight of the acryloxy or methacryloxy groups. Such polysiloxanes which are useful in this invention have an average molecular weight of from about 1000 to about 20,000. Siloxanes of higher molecular weight also may be used but the higher molecular weight siloxanes are not preferred.

Typically, the R groups in Formula III have the structure $$CH_2=C(X)C(O)-O-R'- \qquad (V)$$

wherein R' is a divalent hydrocarbon group of from 1 to 15 carbon atoms or an oxyalkylene group containing from 1 to about 4 carbon atoms in the alkylene moiety.

The siloxanes containing the acryloxy or methacryloxy groups of Formula V can be prepared, for example, by reacting a siloxane containing hydroxyl groups or epoxy groups with acrylic acid or methacrylic acid. The siloxanes containing hydroxyl groups may be prepared by reacting a reactive siloxane (e.g., containing halogen) with a polyhydroxy compound such as ethylene glycol, propylene glycol, glycerol or pentaerythritol.

The organopolysiloxanes described above may be linear or branched and are preferably substantially linear. As will be recognized by those skilled in the art, the organopolysiloxanes of Formula III will also have an appropriate number of end-capping units, $R_3SiO-$ at the terminals of the molecule where R is as previously defined.

The organopolysiloxanes containing acryloxy and/or methacryloxy groups as described above are generally fluids which have viscosities in the range of from about 25 cps to 10,000 cps. Organopolysiloxanes of the type described above are known in the art, and various methods for producing such organopolysiloxanes are described in the patents identified in the Background. The disclosures of U.S. Pat. Nos. 3,878,263; 4,064,286; 4,301,268; 4,306,050; 4,908,274; 4,963,438; 4,978,726; and 5,034,491 are hereby incorporated by reference for their disclosure of acrylate or methacrylate containing organopolysiloxanes and methods of preparing organopolysiloxanes containing acryloxy and/or methacryloxy groups useful in the compositions of the present invention.

Organopolysiloxanes containing acryloxy and/or methacryloxy groups are available commercially from, for example, Goldschmidt Chemical Corp., Hopewell, Va. Goldschmidt's silicone acrylate series include dimethylpolysiloxanes available under the general trade designation Tergo ® RC, and more particularly, under designations such as RC 450, RC 450N, RC 706, RC 707, RC 710, RC 720 and RC 726. Some of these polysiloxanes are of the type prepared by the reaction of acrylic acid or methacrylic acid with dimethylpolysiloxane containing hydroxyl groups or epoxy groups.

In another embodiment, the radiation-curable silicone release composition which can be applied as the third coating comprises a mixture of at least two classes of materials: (i) an organopolysiloxane containing acryloxy or methacryloxy groups described above, and (ii) acrylated or methacrylated organic polyhydroxy compounds or polyamino compounds as described above with regard to the first coating composition. The description regarding the acrylated or methacrylated organic polyhydroxy and polyamino compounds used in the first coating is hereby incorporated by reference for convenience and brevity. All of the acrylated and methacrylated organic polyhydroxy and polyamino compounds described above can be used in combination with the above-described polysiloxanes to form useful release coatings.

The weight ratio of (i) organopolysiloxane to (ii) acrylated and methacrylated polyhydroxy and polyamino compounds may vary over a wide range. Thus, the mixture may comprise from about 2% by weight up to about 90% by weight of the polysiloxane and from about 10% to about 98% by weight of the acrylated or methacrylated polyhydroxy and/or polyamino compounds. In another embodiment silicone release compositions can be used which comprise only about 2 to about 7% of the organopolysiloxane and from about 90% to 98% by weight of the acrylated or methacrylated polyhydroxy and/or polyamino compounds. In another embodiment, the release compositions contain from 93% to about 98% by weight of said compounds.

The silicone-release compositions preferably comprise a mixture of more than one acrylated or methacrylated organic polyhydroxy compound or polyamino compound. Such mixtures may comprise two or more derivatives derived from polyhydroxy compounds, two or more compounds derived from polyamino compounds, mixtures of one or more compounds derived from a polyhydroxy compound and one or more compounds derived from a polyamino compound. Thus, in one embodiment, the mixture comprises a mixture of (1) from about 40% to about 70% by weight of at least one acrylated or methacrylated polyamine oligomer and (2) from about 30% to about 60% by weight of at least one acrylated or methacrylated polyhydroxy compound as described above.

In yet another embodiment of the present invention, a portion of the acrylated or methacrylated compound may be replaced by a liquid monoacrylate ester. For example, from about 1% to about 20% by weight of the polyacrylate in the above mixtures may be replaced by a liquid monoacrylate ester to modify the properties of the radiation-curable silicone release composition and, in some instances, the properties of the radiation-cured release composition. The liquid monoacrylate esters generally are characterized by a low viscosity such as from 1 to about 50 cps at 25° C., and these monoacrylate compounds are useful to improve the fluidity of the curable release compositions of the invention. Examples of such liquid monoacrylate esters include ethyl acrylate, butyl acrylate, 2-ethylhexyl acrylate, allyl acrylate, n-amyl acrylate, benzyl acrylate, cyclohexyl acrylate, diethylaminoethyl acrylate, 2-ethoxyethyl acrylate, n-lauryl acrylate, n-octyl acrylate, octadecyl acrylate, etc., the corresponding methacrylates and mixtures thereof.

The monoacrylate and methacrylate compounds do not form a network when polymerized by radiation. However, the monoacrylates do modify the network formed by the polyfunctional acrylates. These monoacrylate compounds normally copolymerize with the polyfunctional acrylates and methacrylates.

The radiation-curable release compositions useful in the present invention optionally may contain at least one photoinitiator. The amount of photoinitiator included in the release compositions may range from about 0% to about 10%, more often from about 0.5% to about 5% based on the total weight of the radiation-curable composition. A photoinitiator is incorporated into the curable release compositions when compositions are to be cured by exposure to non-ionizing radiation such as ultraviolet light. Photoinitiators are not required when the curable silicone is cured by electron beam radiation. Examples of photoinitiators which may be used in combination with ultraviolet light includes, for example, benzil ketals, benzoin ethers, acetophenone derivatives, ketoxime ethers, benzophenone, benzo or thioxanthones, etc. Specific examples of photoinitiators include: 2,2-diethoxyacetophenone; 2- or 3- or 4-bromoacetophenone; benzoin; benzophenone; benzoquinone; 1-chloroanthroquinone; p-diacetyl-benzene; 9,10-dibromoanthracene; 1,3-diphenyl-2-propanone; 1,4-naphthyl-phenyl ketone; 2,3-pentenedione; propiophenone; chlorothioxanthone; xanthone; and mixtures thereof.

In one preferred embodiment, the radiation-curable silicone release compositions used to form the third coating comprise (A) from about 2% to about 7% by weight of an organopolysiloxane containing acryloxy groups, methacryloxy groups, or mixtures thereof; (B) from about 30% to about 70% by weight of at last one acrylated or methacrylated polyamine; (C) from about 10% to about 70% by weight of at least one acrylated or methacrylated organic polyhydroxy compound; (D) from about 0% to about 20% by weight of at least one liquid monoacrylate ester; and (E) from about 0% to about 5% by weight of at least one photoinitiator. As mentioned above the photoinitiator is not required for electron beam radiation curing.

The radiation-curable silicone release compositions are produced by mixing the above-described components. The components may be mixed at room temperature with stirring, and mild heating may be employed in some instances to facilitate mixing. Since the components of the composition may undergo some separation during storage, mild agitation or mixing just prior to use is effective to redisperse the components and is recommended.

The radiation-curable silicone compositions can be stabilized against premature polymerization during storage by the addition of conventional polymerization inhibitors such as hydroquinone, monomethylether of hydroquinone, phenothiazine, di-t-butyl paracresol, etc. Amounts of 0.1 weight percent or less of the stabilizers are generally effective.

The radiation-curable silicone release compositions are applied to the second coating prior to curing. The amount of silicone release coating applied to the polymer film may vary over a wide range but generally, a coating weight of from about 0.1 to about 10 or more grams/$m^2$ of release composition is satisfactory. The release compositions may be applied to the second coating of the composites by any conventional means known in the coating art such as roller coating, curtain coating, brushing, spraying, reverse roll coating, doctor knife, dipping, die coating, etc. In one particular embodiment, the liquid radiation-curable release compositions are applied as a third coating using offset gravure techniques. The liquid being applied to the substrate may be heated or cooled to facilitate the coating process and to alter the coating thickness.

In another embodiment, in place of the third coating of a radiation-cured silicone release composition, the composites of the present invention may contain a third coating of a pressure-sensitive adhesive composition bonded to the second coating of the polyethylene film. Any pressure-sensitive adhesive composition known in the art can be applied to the composites of the present invention as a third coating. Such adhesive compositions are described in, for example, "Adhesion and Bonding", *Encyclopedia of Polymer Science and Engineering*, Vol. 1, pages 476–546, Interscience Publishers, 2nd Ed. 1985. Such compositions generally contain an adhesive polymer such as natural, reclaimed or styrene butadiene rubber, styrene butadiene or styrene isoprene block copolymers, polyisobutylene, poly(vinyl ether) or poly(acrylic) ester as a major constituent. Other materials may be included in the pressure-sensitive adhesive compositions such as resin tackifiers including, for example: rosin esters, oil-soluble phenolics, or polyterpenes; antioxidants; plasticizers such as mineral oil or liquid polyisobutylenes; and fillers such as zinc oxide or hydrated alumina. The selection of the pressure-sensitive adhesive to be used in any composites of the invention is not critical to this invention, and those skilled in the art are familiar with many suitable pressure-sensitive adhesives for particular applications.

The third coating of pressure-sensitive adhesive can be applied by techniques known to those skilled in this art and at coating weights between about 1 and 100 gms/$m^2$. Composite laminates containing a third coating of pressure-sensitive adhesive are illustrated in FIG. 2 described earlier wherein layer 18 can represent a layer of pressure-sensitive adhesive.

The following examples illustrate the radiation-curable acrylic compositions useful as the first coating in the composite laminates of the present invention. Unless otherwise indicated in the following examples, in the specification and in the appended claims, all parts and percentages are by weight, temperatures are in degrees Centigrade, and pressures are at or near atmospheric pressure.

EXAMPLE 1

|  | %/wt. |
| --- | --- |
| Uvecryl ® 7100 | 50 |
| TMPTA | 30 |
| HDODA | 20 |

EXAMPLE 2

| Uvecryl ® 7100 | 60 |
| --- | --- |
| TMPTA | 20 |
| HDODA | 20 |

EXAMPLE 3

| Uvecryl ® 7100 | 60 |
| --- | --- |
| TMPTA | 20 |
| HDODA | 15 |
| ODA (mixture of octyl and decyl acrylates) | 5 |

The following examples illustrate the radiation-curable silicone release compositions which are particularly useful in forming the third coating of the composites of the present invention which is a release coating.

EXAMPLE 4

|  | %/wt. |
| --- | --- |
| RC-720 silicone | 5.00 |
| Trimethylol propane triacrylate (TMPTA) | 95.00 |

EXAMPLE 5

| RC-726 silicone | 5.00 |
| --- | --- |
| TMPTA | 60.00 |
| Hexanedioldiacrylate (HDODA) | 35.00 |

EXAMPLE 6

| RC-726 silicone | 5.00 |
| --- | --- |
| TMPTA | 60.00 |
| HDODA | 25.00 |
| ODA (Mixture of octyl and decyl acrylates) | 10.00 |

EXAMPLE 7

| RC-450 | 5.50 |
| --- | --- |
| Uvecryl 7100 | 94.50 |

EXAMPLE 8

| RC-450 | 6.00 |
| --- | --- |
| Uvecryl 7100 | 52.00 |
| TMPTA | 21.00 |
| HDODA | 21.00 |

EXAMPLE 9

| RC-726 silicone | 6.00 |
| --- | --- |
| Uvecryl 7100 | 52.00 |
| TMPTA | 14.00 |
| HDODA | 14.00 |
| ODA | 14.00 |

The following examples illustrate the construction of the composite laminates of the present invention.

EXAMPLE A

Substrate: 50-pound bleached Kraft paper.
First coating: cured acrylic mixture of Example 2 applied at about 2 grams/m².
High density polyethylene at 7 pounds per ream.

EXAMPLE B

Substrate: 41-pound per ream offset graded bleached Kraft paper.
First coating: cured acrylic mixture of Example 1 applied at about 1 to 3 grams/m².
Second coating: 18-pounds per ream of linear low-density polyethylene homopolymer.

EXAMPLE C

Substrate: 50-pound per ream bleached Kraft paper.
First coating: cured acrylic mixture of Example 3 applied to about 1 to 3 grams/m².
Second coating: 7-pound per ream high-density polyethylene.
Third coating: electron beam cured silicone of Example 8 applied at about 2 to 5 grams/m².

EXAMPLE D

First coating: cured acrylic mixture of Example 2 applied at about 1 to 3 grams/m².
Second coating: 7-pound per ream high-density polyethylene.
Third coating: electron beam cured silicone of Example 9 applied at about 2 to 5 grams/m².

The composite laminates which are prepared in accordance with the present invention exhibit improved strength, thermal stability, dimensional stability, tear resistance, solvent- and moisture-resistance, etc. An additional significant property of composite laminates of the present invention is their ability to lay flat and remain in a flat condition on aging even when subjected to extreme environmental conditions such as high and low humidity, high and low temperatures, etc. The surface characteristics of the composite laminates of his invention allow for printing by laser printers providing good toner anchorage and printing by flexographic techniques, when used in combination with generally available primers, printing inks and over-varnishes.

While the invention has been explained in relation to its preferred embodiments, it is to be understood that various modifications thereof will become apparent to those skilled in the an upon reading the specification. Therefore, it is to be understood that the invention disclosed herein is intended to cover such modifications as fall within the scope of the appended claims.

We claim:

1. A composite laminate suitable for preparing release sheets or pressure-sensitive adhesive sheets comprising
(A) a substrate sheet of paper;

(B) a first coating bonded to one surface of the substrate sheet, said first coating comprising a radiation-cured acrylic composition comprising, prior to curing, a mixture of (i) at least one acrylated or methacrylated organic polyamino compound, and (ii) at least one acrylated or methacrylated organic polyhydroxy compound; and (C) a second coating bonded to the other surface of the substrate sheet, said second coating comprising a polyolefin film.

2. The composite of claim 1 wherein the radiation-cured acrylic composition of the first coating (B) comprises, prior to curing, (i) from about 30% to about 80% by weight of at least one acrylated or methacrylated organic polyamino compound, and (ii) from about 20% to 70% by weight of at least one acrylated or methacrylated organic polyhydroxy compound.

3. The composite of claim 1 wherein the acrylated or methacrylated organic polyhydroxy compound (ii) comprises one or more di-, tri-, or tetra-acrylates or methacrylates or mixtures thereof.

4. The composite of claim 1 wherein the radiation-cured composition of the first coating additionally comprises, prior to curing, at least one monoacrylate ester compound.

5. The composite of claim 1 wherein first coating is cured by electron beam radiation.

6. The composite of claim 1 wherein the second coating comprises an extruded polyethylene or polypropylene film.

7. The composite of claim 1 wherein the second coating comprises an extruded low density or high density polyethylene film.

8. The composite of claim 1 wherein the composite also comprises
(D) a third coating of pressure-sensitive adhesive or a cured silicone release composition bonded to the polyolefin film coating.

9. A composite laminate suitable for use as a release sheet comprising
(A) a substrate sheet of paper;
(B) a first coating bonded to one surface of the substrate, said first coating comprising a radiation-cured acrylic composition which comprises, prior to curing, (i) from 30% to about 80% by weight of at least one acrylated or methacrylated organic polyamino compound, and (ii) from about 20% to about 70% by weight of at least one acrylated or methacrylated organic polyhydroxy compound;
(C) a second coating bonded to the other surface of the substrate, said second coating comprising an extruded polyethylene film; and
(D) a third coating of a radiation-cured silicone release composition bonded to the exposed surface of the second coating of polyethylene film.

10. The composite of claim 9 wherein the radiation-cured acrylic composition of the first coating (B) comprises, prior to curing, from about 50% to about 70% by weight of an acrylated or methacrylated organic polyamino compound and from about 30% to about 50% by weight of at least one acrylated or methacrylated organic polyhydroxy compound.

11. The composite of claim 9 wherein the radiation-cured acrylic composition of the first coating (B) also comprises, prior to curing, to about 5% of a photoinitiator.

12. The composite of claim 9 wherein the radiation-cured composition of the first coating (B) is cured by electron beam radiation.

13. The composite of claim 9 wherein the second coating (C) comprises an extruded high-density polyethylene film.

14. The composite of claim 9 wherein the third coating of cured silicone release composition (D) comprises, prior to curing, (i) from about 2% to about 7% by weight of an organopolysiloxane containing acryloxy groups, methacryloxy groups, or mixtures thereof, and (ii) from about 90% to about 98% by weight of at least one acrylated or methacrylated organic polyhydroxy compound or polyamino compound.

15. The composite of claim 14 wherein the organopolysiloxane (i) contains from about 3% to about 50% by weight of acryloxy groups, methacryloxy groups, or mixtures thereof.

16. The composite of claim 14 wherein the organopolysiloxane (i) is a polydimethylsiloxane containing acryloxy groups, methacryloxy groups, or mixtures thereof.

17. The composite of claim 14 wherein the third coating, prior to curing, comprises a mixture of (i) the organo polysiloxane, and (ii) a mixture of at least one acrylated or methacrylated polyamino compound and at least one acrylated or polyacrylated organic polyhydroxy compound.

18. The composite of claim 14 wherein the acrylated or methacrylated polyamine compound is a polyacrylated polyamine oligomer having a molecular weight of less than about 2000.

19. A composite laminate suitable for preparing release sheets or pressure-sensitive adhesive sheets comprising
(A) a substrate sheet of paper;
(B) a first coating bonded to one surface of the substrate sheet, said first coating comprising a radiation-cured acrylic composition comprising, prior to curing, a mixture of (i) at least one acrylated or methacrylated organic polyamino compound, characterized by the formula wherein R is derived from a polyamine, X is hydrogen or a methyl group, and n is an integer of at least 2, and (ii) at least one acrylated or methacrylated organic polyhydroxy compound;

wherein R is derived from a polyhydroxy compound, X is hydrogen or a methyl group, and n is an integer of at least 2; and
(C) a second coating bonded to the other surface of the substrate sheet, said second coating comprising a polyolefin film.

20. A composite laminate suitable for use as a release sheet comprising
(A) a substrate sheet of paper;
(B) a first coating bonded to one surface of the substrate, said first coating comprising a radiation-cured acrylic composition which comprises, prior to curing, (i) from 30% to about 80% by weight of at least one acrylated or methacrylated organic polyamino compound, characterized by the formula (I)

wherein R is derived from a polyamine, X is hydrogen or a methyl group, and n is an integer of at least 2, and (ii) from about 20% to about 70% by weight of at least one acrylated or methacrylated organic polyhydroxy compound (II)

wherein R is derived from a polyhydroxy compound, X is hydrogen or a methyl group, and n is an integer of at least 2;

(C) a second coating bonded to the other surface of the substrate, said second coating comprising an extruded polyethylene film; and (D) a third coating of a radiation-cured silicone release composition bonded to the exposed surface of the second coating of polyethylene film.

* * * * *